(12) United States Patent
Mizoguchi

(10) Patent No.: US 8,773,702 B2
(45) Date of Patent: Jul. 8, 2014

(54) CLIENT APPARATUS, PRINT SERVER, IMAGE FORMING APPARATUS, AND PRINT METHOD OF NETWORK PRINT SYSTEM INCLUDING CAPABILITY OF STORAGE OF DATE AND TIME OF GENERATION OF PRINT DATA AND IDENTIFICATION INFORMATION ASSOCIATED THEREWITH, AND CAPABILITY OF DELETION FROM STORAGE OF PRINT DATA OLDER THAN A PREDETERMINED TIME

(75) Inventor: Yoshihiro Mizoguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 34 days.

(21) Appl. No.: 13/458,395

(22) Filed: Apr. 27, 2012

(65) Prior Publication Data

US 2012/0287465 A1 Nov. 15, 2012

(30) Foreign Application Priority Data

May 12, 2011 (JP) ................................. 2011-107220

(51) Int. Cl.
*G06F 3/12* (2006.01)
(52) U.S. Cl.
USPC ................. 358/1.15; 400/61; 400/70; 400/76
(58) Field of Classification Search
CPC ... G06F 3/1204; G06F 3/1274; G06F 3/1288; G06F 21/608
USPC ........................................................ 358/1.15
See application file for complete search history.

(56) References Cited

U.S. PATENT DOCUMENTS

| | | | |
|---|---|---|---|
| 6,299,364 B1 | 10/2001 | Maruta et al. | |
| 2002/0036798 A1 | 3/2002 | Sumiyama et al. | |
| 2009/0009780 A1 | 1/2009 | Hayashi et al. | |
| 2009/0086261 A1* | 4/2009 | Irino | 358/1.15 |
| 2009/0207440 A1 | 8/2009 | Kaneko et al. | |
| 2011/0063667 A1* | 3/2011 | Nishida | 358/1.15 |
| 2011/0194153 A1 | 8/2011 | Takahata | |

FOREIGN PATENT DOCUMENTS

| | | |
|---|---|---|
| JP | 2001-312388 A | 11/2001 |
| JP | 2002-359709 A | 12/2002 |
| JP | 2003-108343 A | 4/2003 |
| JP | 2004-159184 A | 6/2004 |

(Continued)

OTHER PUBLICATIONS

English Machine Translation of JP 2009-181171-A (Akiyama, Published Aug. 8, 2009).*

(Continued)

*Primary Examiner* — Benny Q Tieu
*Assistant Examiner* — Juan M Guillermety
(74) *Attorney, Agent, or Firm* — Edwards Wildman Palmer LLP; David G. Conlin; David A. Tucker

(57) ABSTRACT

A client apparatus includes a media reader/writer and a network I/F for data communication with a print data generation server, reads electronic data stored in the medium (step 218), transmits the same to the print data generation server and requests generation of print data (step 220). An identification number transmitted from the print data generation server in response to the electronic data is received through a data communication device (step 222), and stored in the medium (step 224). Using the identification number, the print data corresponding to the transmitted electronic data can be accessed.

7 Claims, 10 Drawing Sheets

(56) References Cited

FOREIGN PATENT DOCUMENTS

| | | | |
|---|---|---|---|
| JP | 2005-129007 A | 5/2005 |
| JP | 2005-267002 A | 9/2005 |
| JP | 2007-072653 A | 3/2007 |
| JP | 2009-181171 A | 8/2009 |
| JP | 11-95938 A | 11/2012 |

OTHER PUBLICATIONS

Non-Final Office Action dated Nov. 7, 2013 for related U.S. Appl. No. 13/475,627.

* cited by examiner

| ID INFORMATION | ELECTRONIC DATA NAME | PRINT DATA NAME | DATA GENERATION DATE & TIME | STATE |
|---|---|---|---|---|
| 0001 | DOCUMENT A | DOCUMENT A0001 | 2011/3/15 15:00 | READY TO PRINT |
| 0002 | DOCUMENT B | DOCUMENT B0002 | 2011/3/15 15:01 | READY TO PRINT |
| 0003 | DOCUMENT C | | | PREPARING |
| | | | | |

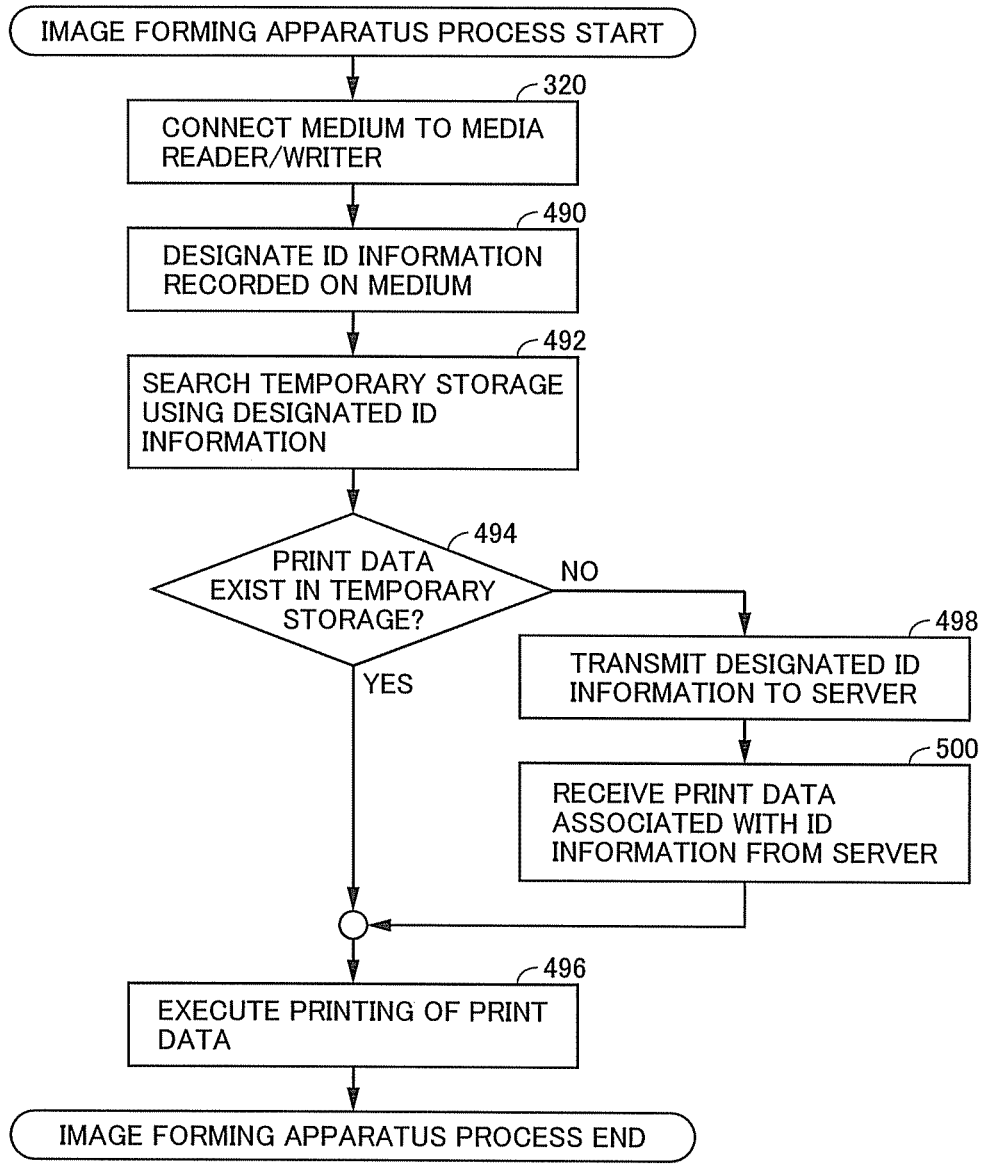

CLIENT APPARATUS, PRINT SERVER, IMAGE FORMING APPARATUS, AND PRINT METHOD OF NETWORK PRINT SYSTEM INCLUDING CAPABILITY OF STORAGE OF DATE AND TIME OF GENERATION OF PRINT DATA AND IDENTIFICATION INFORMATION ASSOCIATED THEREWITH, AND CAPABILITY OF DELETION FROM STORAGE OF PRINT DATA OLDER THAN A PREDETERMINED TIME

CROSS-REFERENCE TO RELATED APPLICATION

This nonprovisional application claims priority under 35 U.S.C. §119(a) on Patent Application No. 2011-107220 filed in Japan on May 12, 2011, the entire contents of which are hereby incorporated by reference.

BACKGROUND OF THE INVENTION

1. Field of the Invention

The present invention relates to a network system including a server generating print data, a client apparatus (hereinafter simply referred to as a client) transmitting electronic data to the server and requesting generation of print data, and an image forming apparatus for printing the print data generated by the server. More specifically, the present invention relates to a network print system that saves the user's trouble in the process of transmitting electronic data from the client to the server and the process of printing at the printing apparatus.

2. Description of the Background Art

Recently, a network print system has been provided, in which a request to generate print data from electronic data is issued to a network print server (print data generation server) provided on the Internet, the print data is downloaded from the server to an image forming apparatus installed, for example, in a convenience store and printing is done. Using such a system, a user registers electronic data to be printed with the network print server and requests generation of print data. The print server generates a unique identification number associated with the electronic data, and presents the number to the user. The user notes down the number, and when he/she uses the network print service of the image forming apparatus in the convenience store, he/she inputs the identification number to start printing of the electronic data he/she has requested.

In such a system, however, if the user enters a wrong number, he/she cannot obtain the desired print data. Therefore, the user must surely record or remember the identification number. Particularly if a number of electronic data are to be printed, it is necessary for the user to accurately remember all the corresponding identification numbers, which is rather troublesome.

As a solution to such a problem, Japanese Patent Laying-Open No. 2005-129007 discloses a system in which user authentication is required when using a print server, a portable memory to be connected to/disconnected from a client is provided, and all pieces of necessary information for user authentication are stored in the portable memory. Since user authentication takes place when the print server is used, user-by-user management of electronic data is possible in the print server. When a user accesses the print server through an image forming apparatus installed, for example, in a convenience store, user authentication is done using the same portable memory. Therefore, the print server can have a list of print data related only to the user displayed on the image forming apparatus. Thus, it is possible for the user to select and print the print data generated by the print server in a similar manner as when he/she selects a document using a general personal computer.

In the system described in Japanese Patent Laying-Open No. 2005-129007, however, if there is a number of print data of which generation has been requested by one same user, it is necessary for the user to select the appropriate data therefrom. In order to eliminate such an operation, it is necessary for the user to manage anew the print data stored in the print server. As a result, it has been difficult for the user to print only the necessary print data through a simple operation.

SUMMARY OF THE INVENTION

Therefore, it is desirable to provide a client apparatus, a print data generation server and an image forming apparatus for a network print system, that enable printing of only the necessary data for the user through a simple operation.

According to an aspect, the present invention provides a client apparatus used in a network print system. The network print system includes a print data generation server. The print data generation server has a function of generating, in response to reception of electronic data, print data for printing from the electronic data, and returning identification information corresponding to the electronic data to the source of transmission of the electronic data. The client apparatus includes: a data input/output device having a function of communicating with a portable data storage medium, configured to input/output data to/from the data storage medium rendered communicable; a data communication device realizing data communication to/from the print data generation server through the network; an electronic data transmission device configured to read the electronic data stored in the data storage medium through the data input/output device and to transmit the electronic data to the print data generation server through the data communication device; and an identification information receiving device configured to receive the identification information corresponding to the electronic data transmitted in response to the electronic data transmitted from the electronic data transmitting device to the print data generation server, from the print data generation server through the data communication device and to store in the data storage device through the data input/output device.

When communication between the data storage medium and the data input/output device becomes possible, the electronic data transmitting apparatus reads electronic data in the data storage medium, and transmits the data to the print data generation server. In response to the electronic data, the print data generation server returns the identification information corresponding to the electronic data. The identification information is received by the identification information receiving device, and stored in the data storage medium. Since the identification information of the electronic data is stored in the data storage medium, it is possible by reading the data in the data storage medium to identify the electronic data that has been transmitted to the print data generation server and the data generated from the electronic data, for example, the print data. It is unnecessary for the user to remember or record the identification information and, therefore, the trouble of the user can be saved. Problems caused by incorrect memory of identification information can be prevented.

More preferably, the client apparatus further includes: an identification information transmitting device configured to read the identification information stored in the data storage medium through the data input/output device and to transmit to the print data generation server through the data communication device; a print data presence/absence information receiving device configured to receive a piece of information indicating presence/absence of print data corresponding to the identification information returned in response to the identification information transmitted from the identification information transmitting device, from the print data generation server; and an identification information deleting device configured to delete, based on the piece of information received by the print data presence/absence information receiving device, the identification information lacking corresponding print data from the data storage medium through the data input/output device.

If the pieces of identification information are received time and again by the identification information receiving device, the data storage medium comes to store a large amount of identification information. When the corresponding print data no longer exists, such pieces of identification information are useless. When the identification information transmitting device reads a piece of identification information stored in the data storage medium and transmits the information to the print data generation server, a piece of information indicating presence/absence of the print data corresponding to the identification information (print data presence/absence information) is returned. In accordance with the print data presence/absence information, the identification information lacking the corresponding print data is deleted from the data storage medium. Since there is no corresponding print data, deletion of the identification information causes no problem. Storage capacity of the data storage medium can be better utilized.

A display device may be connectable to the client apparatus. The electronic data transmitting device includes: a list display device configured to read data names of the electronic data stored in the data storage device through the data input/output device and to display a list of the data names on the display device connected to the client apparatus; a data name designating device configured to receive designation of a data name of the electronic data to be transmitted to the print data generation server through an interactive process with the user, from the list of data names displayed by the list display device; and a transmitting device configured to read the electronic data corresponding to the data name designated by the electronic data designating device from the data storage medium through the data input/output device and to transmit the electronic data to the print data generation server through the electronic data transmitting device.

According to a second aspect, the present invention provides a print data generation server used in a network print system. The print data generation server includes: a communication device communicable with a client apparatus provided at a distance and with an image forming apparatus; an identification information transmitting device configured to generate, in response to reception of electronic data transmitted from any client apparatus through the communication device, identification information corresponding to the electronic data and to return the identification information to the client apparatus that has transmitted the electronic data; a print data generating device configured to execute, in response to reception of the electronic data, a process for generating print data corresponding to the electronic data; a storage device configured to store the print data generated by the print data generating device in association with the identification information generated for the corresponding electronic data by the identification information transmitting device; and a print data transmitting device configured to search, in response to reception of a request for transmission of print data with designation of the identification information through the communication device, for the print data stored in association with the identification information designated by the request in the storage device and to transmit the print data to the device that transmitted the request, through the communication device. The print data generation server further includes: a generation date and time storage device configured to store date and time of generation of the print data by the print data generating device, in association with the identification information of each electronic data in the storage device; and a deleting device connected to the generation date and time storage device and to the storage device, configured to periodically check elapsed time from generation of the print data stored in the storage device and to delete the print data older than a predetermined time period from the storage device.

According to a third aspect, the present invention provides an image forming apparatus used in a network print system, including: a communication device communicable with a print data generation server provided at a distance; a data input/output device having a function of communicating with a portable data storage medium, configured to input/output data to/from the data storage medium rendered communicable; a print data requesting device configured to read identification information, stored in the data storage medium rendered communicable with the data input/output device and identifying print data generated by the print data generation server, to transmit the identification information to the print data generation server through the communication device and thereby to request transmission of the print data; and an image forming device configured to receive the print data transmitted from the print data generation server in response to the request by the print data requesting device, and to form an image of the print data on a storage medium by controlling the image forming apparatus.

Preferably, the image forming apparatus further includes a storage device configured to receive, in response to the communication device receiving identification information of the print data from another device, the print data corresponding to the identification information from the print data generation server and to store the print data. The print data requesting device includes a determining device configured to read identification information stored in the data storage medium rendered communicable with the data input/output device and to determine whether or not the print data corresponding to the identification information is stored in the storage medium, and a print data obtaining device configured to selectively execute a process for reading and thereby obtaining the print data corresponding to the identification information stored in the data storage medium rendered communicable with the data input/output device stored in the storage device and applying the print data as an input to the image forming apparatus, and a process for reading and thereby obtaining the print data corresponding to the identification information stored in the data storage device rendered communicable with the data input/output device from the print data generation server and applying the print data as an input to the image forming apparatus, depending on the determination by the determining device.

As described above, according to the present invention, when the client transmits electronic data to the print data generation server, the identification information corresponding to the electronic data is returned to the client, and recorded by the client in a portable storage medium. When the user connects the storage medium to an image forming apparatus, for example, the image forming apparatus can receive the print data generated from the electronic data corresponding to the identification information and print the same, using the identification information stored in the storage medium. It is unnecessary for the user to remember or record the identification information and, therefore, a network print system convenient for the user can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a flowchart representing a control structure of a program for printing print data, executed by the image forming apparatus in the system in accordance with the second embodiment.

DESCRIPTION OF THE PREFERRED EMBODIMENTS

Figure 1:
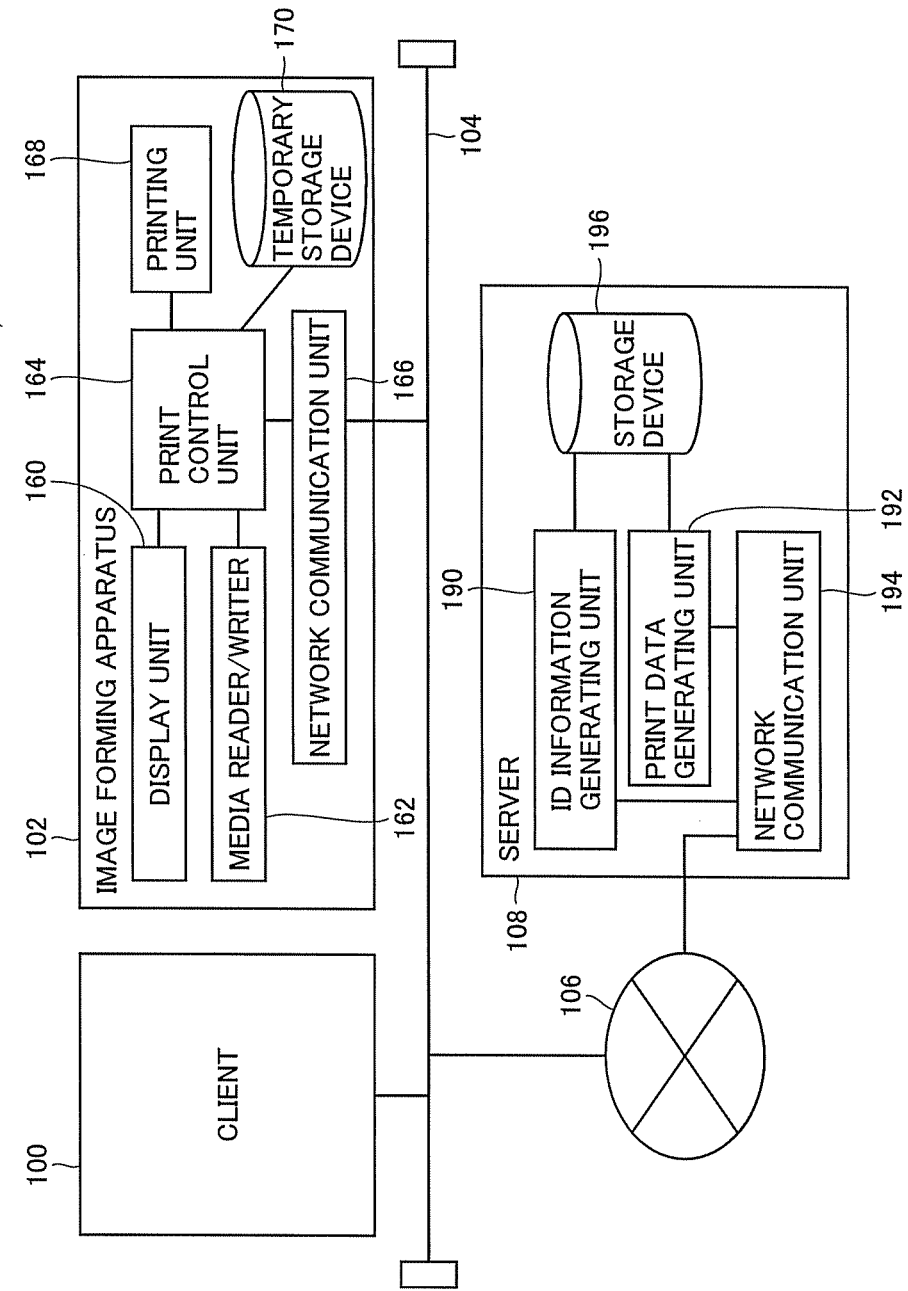
FIG. 1 is a block diagram showing an overall configuration of a network print system in accordance with a first embodiment of the present invention.

In the following description and in the drawings, the same components are denoted by the same reference characters. Therefore, detailed description thereof will not be repeated.
<First Embodiment>
In the first embodiment, when electronic data is transmitted from a portable storage medium connected to the client to the print server, the print server generates unique identification information for the electronic data. The identification information is transmitted from the print server to the client. The client has the identification information stored in the connected storage medium. When the electronic data is to be printed by the image forming apparatus, the storage medium is connected to a media reader/writer of the image forming apparatus, and then, the identification information is read and transmitted to the print server, the print data corresponding to the identification information is downloaded from the print server to the image forming apparatus, and printing is done.

Referring to FIG. 1, a network print system 50 in accordance with the present embodiment includes: an LAN (Local Area Network) 104 connected to the Internet 106; an image forming apparatus 102 connected to LAN 104; a client 100 connected to LAN 104, used by the user for printing electronic data using image forming apparatus 102; and a server 108, communicable both with client 100 and image forming apparatus 102 through the Internet 106 and LAN 104, and providing services of generating print data from the electronic data received from a device such as client 100, transmitting the print data to a printing device such as image forming apparatus 102, and causing printing. In the present embodiment, client 100 and image forming apparatus 102 are devices both installed in a convenience store, and are expected to be used by unidentified number of users.

Figure 2:
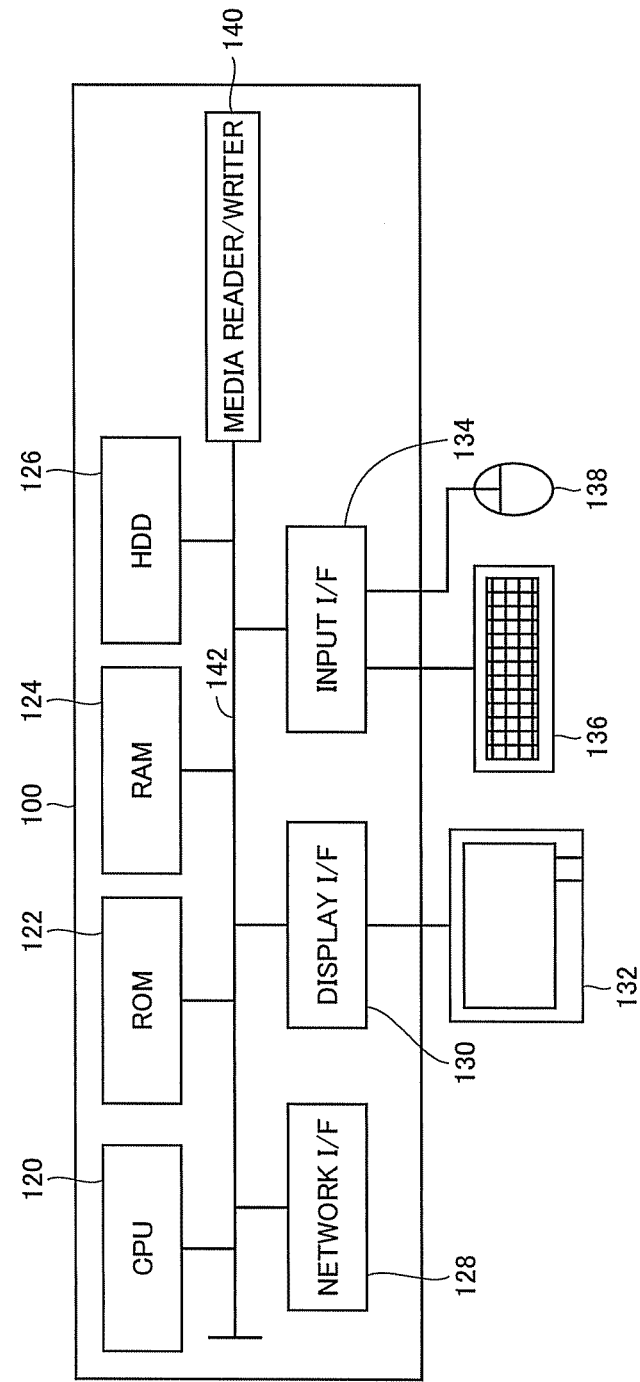
FIG. 2 is a hardware block diagram of the client shown in FIG. 1.

Referring to FIG. 2, client 100 is substantially a computer, including: a bus 142, and a CPU (Central Processing Unit) 120, an ROM (Read Only Memory) 122 storing a boot-up program and the like, an RAM (Random Access Memory) 124, a hard disk drive (HDD) 126, a media reader/writer 140 to which a storage medium can be connected/disconnected, a network interface (hereinafter "interface" will be simply denoted as I/F) 128 providing connection to LAN 104 (see FIG. 1), a display I/F 130 to which a monitor 132 is connected, and an input I/F 134 connecting a keyboard 136 and a mouse 138 to bus 142, all connected to bus 142. As in a common computer, CPU 120, ROM 122, RAM 124 and HDD 126 are used for executing prescribed programs, as will be described later. Particularly, RAM 124 is used as a temporary storage, and HDD 126 is used as a non-volatile storage.

Again referring to FIG. 1, image forming apparatus 102 is also substantially a computer, and similar to client 100, it includes: a print control unit 164 including a CPU, an ROM and an RAM for executing programs and controlling various components; a display unit 160 connected to print control unit 164; a media reader/writer 162, similar to media reader/writer 140 of client 100, connected to print control unit 164 and to which various storage media can be connected, for inputting/outputting data to and from each storage medium; a network communication unit 166 providing print control unit 164 with a connection to LAN 104; a printing unit 168, connected to print control unit 164, for performing the process of forming (printing) an image on a prescribed medium under the control of print control unit 164; and a temporary storage device 170, connected to print control unit 164 for temporarily, storing various electronic data, print data received from server 108, and other data necessary for providing services.

Server 108 is also substantially a computer, and it has a hardware configuration similar to that shown in FIG. 2. Functionally, server 108 includes: a network communication unit 194 providing an environment communicable with other apparatuses through the Internet 106; an ID information generating unit 190, responsive to reception of electronic data from an apparatus or device such as client 100 through network communication unit 194, for generating unique identification information (hereinafter referred to as "ID information") indicating the electronic data, and returning the information to client 100 or the like that transmitted the electronic data; a storage device 196 storing the electronic data received by ID information generating unit 190, the print data generated from the electronic data, ID information generated for each electronic data and so on; and a print data generating unit 192, responsive to ID information generating unit receiving the electronic data, for generating the print data from the electronic data, temporarily storing the generated print data in association with the ID information allocated to the electronic data in storage device 196, and responsive to reception of a print data transmission request designating the ID information from an image forming apparatus such as image forming apparatus 102, for reading the print data corresponding to the designated ID information from storage device 196 and returning to the image forming apparatus through network communication unit 194. Storage device 196 stores a print data management table (not shown) for holding the electronic data, print data and the ID information associated with each other. The configuration of print data management table will be described later with reference to FIG. 7. The electronic data and the print data are in one-to-one correspondence. Therefore, the ID information for the electronic data is also the ID information for the print data generated from the electronic data. In the following, description will be given assuming that the electronic data and the print data generated from the electronic data can be designated by the same ID information.

In the present embodiment, the following programs are executed by the apparatuses/devices.

Client 100 executes the following program.

The program for the user to request printing of electronic data.

Server 108 executes the following four programs.

A program for checking whether or not unnecessary ID information remains in a storage medium of the user, upon reception of a request for printing electronic data.

A program, responsive to the request for printing electronic data, for temporarily storing the received electronic data and generating print data.

A program for transmitting, when a request for transmitting print data designated with ID information is received from image forming apparatus 102 or the like, the corresponding print data.

A program for periodically deleting print data and electronic data that are no longer necessary.

Image forming apparatus 102 executes the following program.

A program for reading, when a user connects the storage medium, the ID information stored in the storage medium, transmits the information to server 108 with the request for print data, and printing the returned print data.

Figure 3:
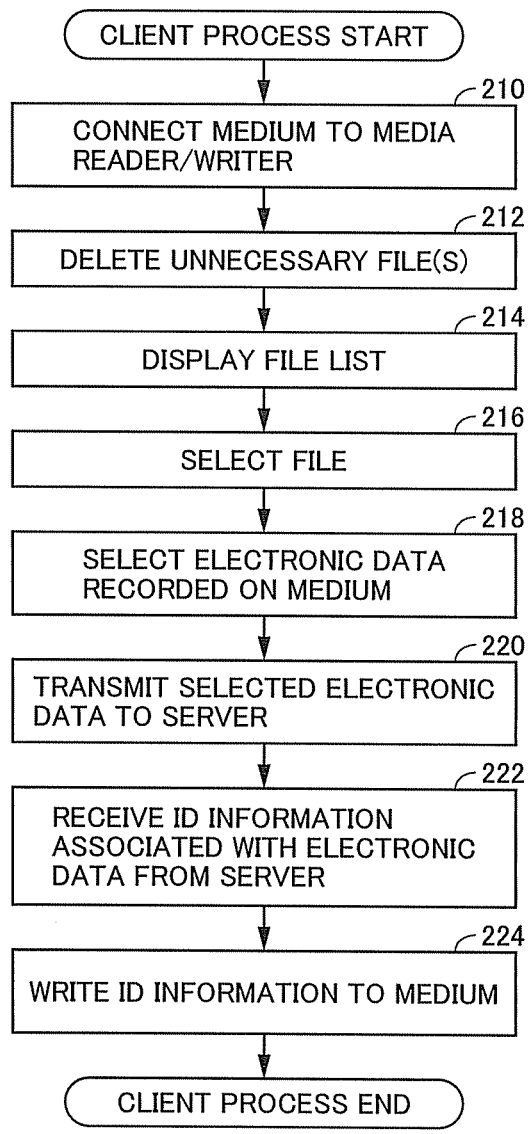
FIG. 3 is a flowchart representing a control structure of a computer program for realizing an electronic data registration process executed by the client.

Referring to FIG. 3, the program executed by client 100 when the user requests server 108 to print the electronic data as the object of printing has the following control structure. In the present embodiment, on a monitor 132 of client 100, a menu including an item such as "print request by network print system" is displayed. When the user selects this item, the program, of which control structure will be described below, is activated.

The program includes: a step 210 of providing, after activation, a display urging the user to connect the storage medium to media reader/writer 140 and confirming connection of the storage medium; a step 212 of deleting ID information used when the network print system was used before and still stored in the connected storage medium, which is no longer necessary; a step 214 of displaying a list of file names as possible object of printing, stored in the connected storage medium; and a step 216 of urging the user to designate the file of which printing is requested, and confirming the input. Details of step 212 will be described later with reference to FIG. 4.

The program further includes: a step 218 of selecting and reading the electronic data designated at step 216, from the electronic data recorded on the storage medium; a step 220 of processing the read electronic data including encoding and compression, and transmitting the processed electronic data with the print request to server 108; a step 222 of waiting for the ID information corresponding to the electronic data of which printing has been requested, returned from server 108 in response to the print request transmitted at step 220; and a step 224, responsive to reception of the ID information at step 222, of writing the ID information in the storage medium connected to media reader/writer 140 and ending the process.

Figure 4:
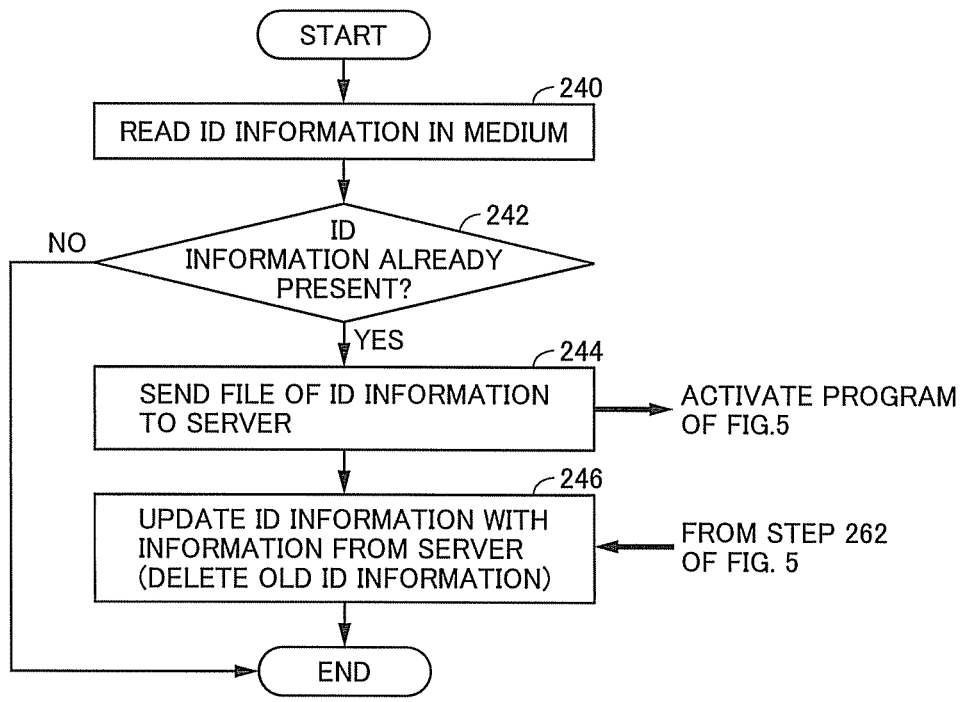
FIG. 4 is a flowchart representing a control structure of a routine for deleting identification information stored in a portable storage medium, of the program whose control structure is shown in FIG. 3.

Referring to FIG. 4, the program routine executed at step 212 of FIG. 3 includes: a step 240 of reading all pieces of ID information used in the past in the network print system, stored in the storage medium connected to media reader/writer 140; a step 242 of determining whether or not any ID information has been read at step 240, and ending execution of the routine if none has been read; a step 244 of transmitting, if it is determined at step 242 that any ID information has been read, the ID information to server 108 with a piece of information requesting checking of necessity of the ID information; and a step 246, based on a piece of information returned from server 108 in response to the request transmitted at step 244, of deleting, of the pieces of ID information recorded in the storage medium, such ID information that corresponds to the information already deleted from server 108, and ending the process.

Figure 5:
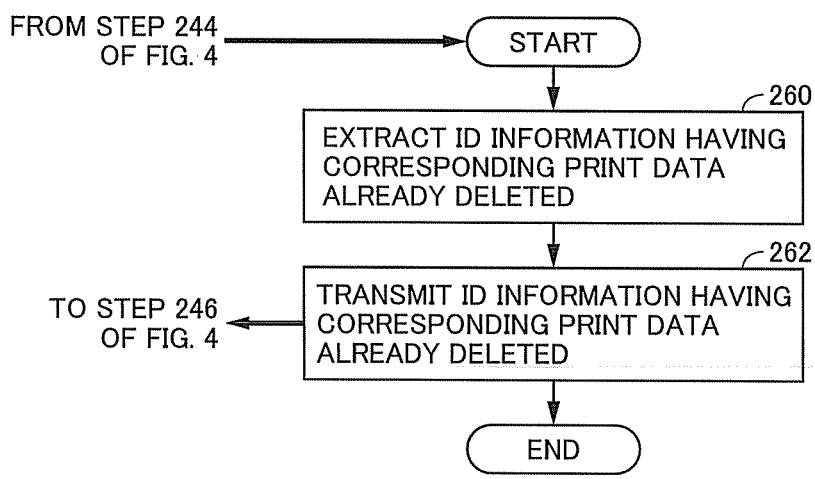
FIG. 5 is a flowchart representing a control structure of a program corresponding to the routine shown in FIG. 4, executed by the print server.

Referring to FIG. 5, in response to the information transmitted at step 244, in server 108, the program, of which control structure wifi be described below, is activated and executed. The program includes: a step 260 of checking whether or not the print data corresponding to the ID information included in the received request of checking necessity is stored in storage device 196 and extracting ID information corresponding to the already deleted print data; and a step 262 of transmitting the ID information extracted at step 260 as the ID information to be deleted, to the client that has transmitted the request for checking necessity, and ending the process.

Figures 6, 7:
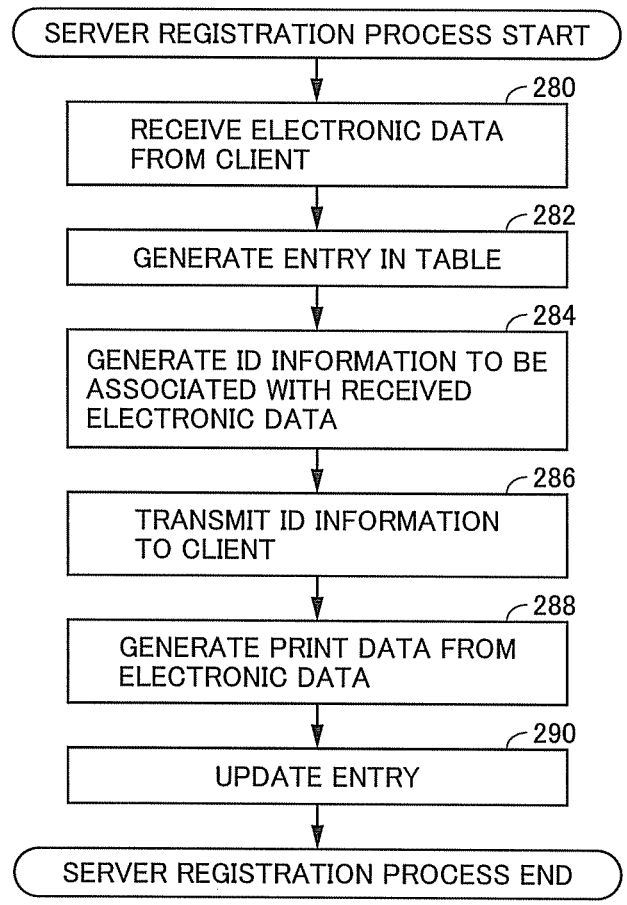
FIG. 6 is a flowchart representing a control structure of a program executed by the print server, for processing the electronic data transmitted from the client in accordance with the program shown in FIG. 3.
FIG. 7 schematically shows a structure of a table for managing states of electronic data maintained in the print server.

Referring to FIG. 6, the program for the server registration process executed by server 108 in response to reception of the request for printing electronic data from client 100 has the following control structure. The program includes: a step 280 of receiving the electronic data corresponding to the print request from client 100; and a step 282 of generating a new entry corresponding to the received electronic data in the management table for managing the print data, and initializing the contents thereof.

FIG. 7 shows the configuration of management table. Referring to FIG. 7, management table 300 includes one entry for each electronic data for which generation of print data has been requested. Each entry includes unique ID information allocated to the electronic data, name of the received electric data, data name (print data name) of the print data generated from the electronic data and stored in storage device 196, date and time when the print data was generated (data generation date and time), and state of the print data. The data generation date and time are necessary to delete the print data that is no longer necessary, as will be described later. The state of print data is necessary for management to determine whether or not printing is possible, when a request for print data is received from, for example, image forming apparatus 102. If the state is "READY TO PRINT," it means that the print data has been generated and can immediately be transmitted to image forming apparatus 102. If the state is "PREPARING," generation of the print data is not yet complete. At step 282 of FIG. 6, after the entry for the electronic data received at step 280 is formed, the name of the electronic data is entered and the "state" column is initialized to "PREPARING."

The program further includes: a step 284 of generating unique identification information to be associated with (allocated to) the received electronic data and storing it in the column of "ID information" of the corresponding entry; a step 286 of transmitting the generated ID information to the counterpart client; a step 288 of generating the print data from the electronic data received at step 280 and storing the data in storage device 196; and a step 290 of entering the generated print data name in the column of print data name, the generation date and time of the print data to the column of data generation date and time, of the corresponding entry of the management table, updating the state column to "READY TO PRINT" and ending the process related to the request for generating print data.

Figure 8:
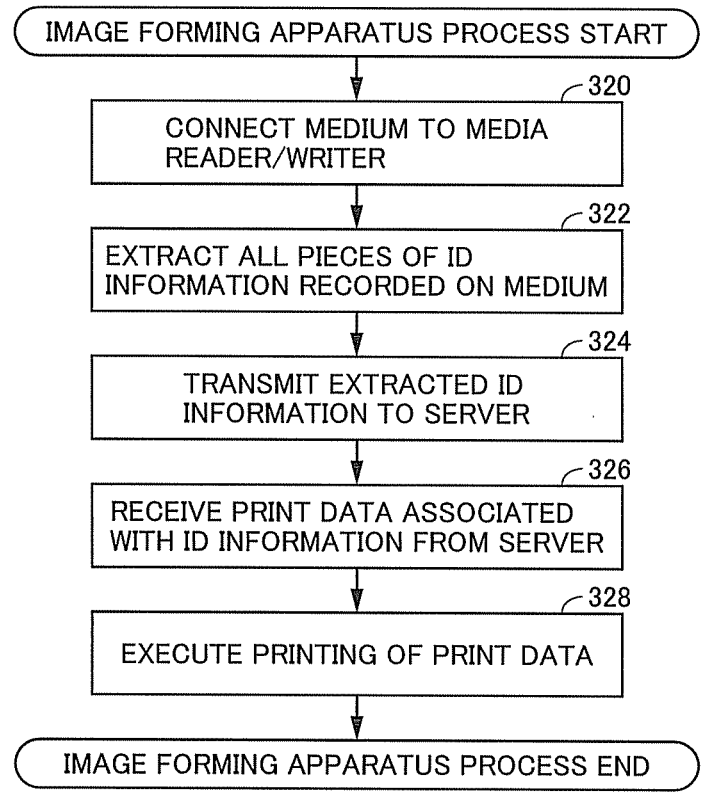
FIG. 8 is a flowchart representing a control structure of a program for realizing a process for printing the print data generated by the print server, by the image forming apparatus.

Referring to FIG. 8, the program executed in image forming apparatus 102 when printing of electronic data is designated by the user includes: a step 320 of urging the user to connect a storage medium storing the ID information of the electronic data to media reader/writer 162, and confirming connection; a step 322 of reading all pieces of ID information recorded on the storage medium; a step 324 of transmitting the ID information read at step 322 to server 108; a step 326 of receiving print data associated with the transmitted ID information from server 108; and a step 328 of printing the received print data by printing unit 168 (see FIG. 1) and ending the process.

Figure 9:
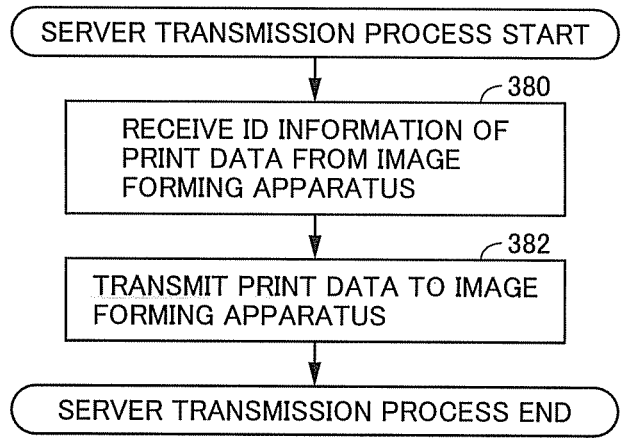
FIG. 9 is a flowchart of a program representing a control structure of a program executed by the server when identification information for the print data from the image forming apparatus is received.

Referring to FIG. 9, upon reception of a print data transmission request from image forming apparatus 102, server 108 executes the following program. The program includes: a step 380 of receiving the ID information of print data from image forming apparatus 102; and a step 382 of transmitting the print data corresponding to the ID information received at step 380 to image forming apparatus 102 and ending the process. Actually, execution of the program shown in FIG. 9 starts every time a print data transmission request with the ID information is received from the image forming apparatus.

Figure 10:
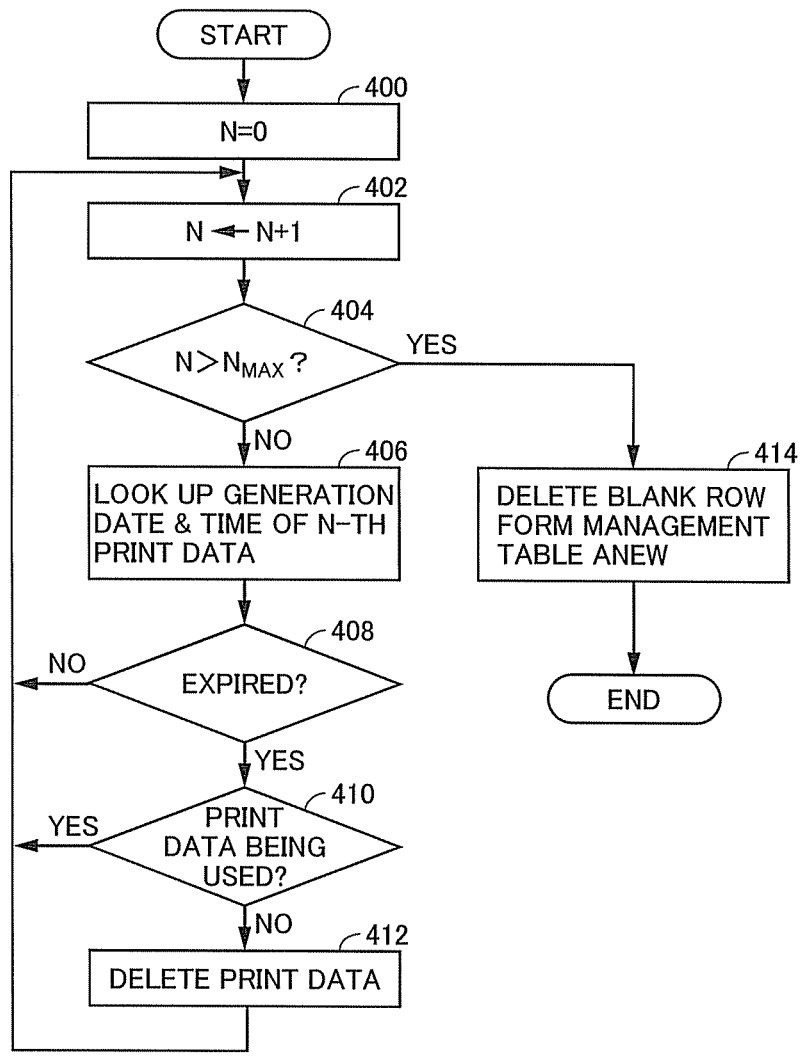
FIG. 10 is a flowchart representing a control structure of a program for deleting unnecessary print data, executed periodically by the print server.

It is inefficient to hold print data in server 108 after a certain time period from generation of the print data. Therefore, in the present embodiment, server 108 executes a process of deleting the print data of which time from generation passed a prescribed time period, on a regular basis (for example, once a day). FIG. 10 shows, in the form of a flowchart, the control structure of the program for this process. The program shown in FIG. 10 is executed periodically (for example, at a fixed time every day, at a time interval of one hour, or on a weekly basis), by a mechanism for periodically activating a designated program in server 108.

The program includes: a step 400 of inputting a constant 0 to a variable N indicating entry row number of management table 300; a step 402 of adding 1 to variable N; a step 404 of determining whether or not the value of variable N is larger than the maximum number of rows NMAX of management table 300; and a step 414, executed if the determination at step 404 is positive, of deleting all blank rows in management table 300, creating management table 300 anew and ending the process.

The program further includes: a step 406, executed if the determination at step 404 is negative, of looking-up the contents in the column of generation date and time of the N-th entry of management table 300; and a step 408 of comparing the generation date and time read at step 406 with a predetermine period (for example, one month from the generation date and time), and determining whether or not the print data has been expired. If it is determined at step 408 that the print data is not yet expired, the control returns to step 402.

The program further includes: a step 410, executed if the determination at step 408 is YES, of determining whether or not the print data of the corresponding entry is being used (for example, if it is being subjected to a printing process by, for example, image forming apparatus 102), and if it is used, directly returning the control to step 402 without any operation; and a step 412, executed if the determination at step 410 is negative, of deleting the print data from storage device 196 based on the value of print data column of the entry, updating the corresponding entry of management table 300 to blank, and returning the control to step 402.

<Operation>

The network print system 50 having the structure above operates in the following manner. First, the user creates electronic data of a document as the object of printing using, for example, a personal computer, not shown, and stores the data in a portable storage medium. Assume that the user does not have any printer and wishes to have the electronic data printed by network print system 50.

The user visits a convenience store having client 100 and image forming apparatus 102 installed, and selects a menu of printing by network printer service from a screen image. Then, the program having the control structure shown in FIG. 3 is activated in client 100. First, at step 210, client 100 causes a monitor 132 to display a message asking the client to connect the storage medium to media reader/writer 140. If it is confirmed that the user has connected the storage medium to media reader/writer 140, at step 212, the process for deleting unnecessary ID information recorded in the storage medium is executed.

Referring to FIG. 4, client 100 reads all pieces of ID information used in network print system 50 stored in the storage medium connected to media reader/writer 140 (step 240), and if there is any ID information (step 242), deletes the ID information having no corresponding print data stored in server 108 from the storage medium by the process at steps 244 and 246. If ID information is not at all recorded in the storage medium, the process ends without necessitating the processes of steps 244 and 246.

By way of example, assume that no ID information has been recorded in the storage medium. Then, in the routine shown in FIG. 4, the determination from step 240 to step 242 would be NO, and hence, step 212 of FIG. 3 ends without any operation. In server 108 that received the ID information transmitted at step 244, the program shown in FIG. 5 is executed. Specifically, whether or not there is an entry of the print data corresponding to the received ID information in management table 300 is determined, the pieces of ID information lacking the corresponding entries are extracted at step 260, and at step 262, the extracted pieces of ID information are returned to client 100.

Again referring to FIG. 3, following step 212, at step 214, a list of electronic data recorded in the storage medium is displayed on monitor 132, and at step 216, the user designates the electronic data as the object of printing from the electronic data. Thereafter, by the process of steps 218 and 220, client 100 reads the designated electronic data from the storage medium, and transmits the data with a print request to server 108.

Upon reception of the print request, the program shown in FIG. 6 is activated in server 108. At step 280, the electronic data is received, and at step 282, an entry corresponding to the received electronic data is formed in management table 300 (see FIG. 7). Here, referring to FIG. 7, "NULL" is inserted to the ID information, print data name and data generation date and time. In the column of electronic data name, the name of received electronic data is inserted. In the column of state, "PREPARING" is inserted.

Next, at step 284, new ID information corresponding to the newly received electronic data is generated, and this piece of ID information is input to the ID information column of management table 300. Thereafter, at step 286, the generated ID information is returned to client 100. Further, server 108 executes the process for generating the print data from the received electronic data (step 288), and stores the generated print data in storage device 196. Further, server 108 inputs a file name of the print data in the column of print data name of management table 300, inputs the date and time of generation of the print data in the column of data generation date and time, and updates the state column to "READY TO PRINT," whereby corresponding entries of management table 70 are updated, and the process ends.

On the other hand, the ID information transmitted from server 108 at step 286 of FIG. 6 is received by client 100 at step 222 of FIG. 3. At the following step 224, client 100 writes the ID information to the storage medium by means of media reader/writer 140, and the process ends. The user takes out the storage medium from client 100.

The user has the electronic data, which has been transmitted previously, printed by image forming apparatus 102 installed in the same store. Typically, it takes some time from when the electronic data is received by server 108 until generation of print data is completed. Therefore, to ensure completion of print data generation, it may be better to wait for some time before starting printing.

It is assumed that a menu including an item of printing by the network print system is displayed on the monitor, not shown, of image forming apparatus 102. When the user selects this item, in image forming apparatus 102, execution of the program shown in FIG. 8 starts. Here, a message asking the user to connect the storage medium to a media reader/writer 162 is displayed, and the control waits until the user connects the storage medium. When the storage medium is connected to media reader/writer 162 allowing input/output of data, all pieces of ID information recorded on the storage medium are read at step 322. These pieces of ID information are all transmitted with information requesting print data to server 108 (step 324), and the control waits until the corresponding print data is transmitted from server 108.

In server 108, in response to the request for print data transmission transmitted at step 324 of FIG. 8, execution of the program shown in FIG. 9 starts. Specifically, at step 380, ID information of the print data accompanying the print data transmission request is received, the print data corresponding to the ID information is read from storage device 196 with reference to management table 300, and the data is transmitted to image forming apparatus 102 (steps 382), and the process ends.

Again referring to FIG. 8, in client 100, the print data from server 108 is received at step 326, the print data is printed by printing unit 168 at step 328, and the process ends.

On the other hand, in server 108, the program having the control structure shown in FIG. 10 is executed periodically. Typically, through the steps 400, 402, 404, 406 and 408, if the print data as the object of checking has been expired, the print data is deleted at step 412 unless the file is being used, and the corresponding entry in management table 300 is updated to blank. When checking of every print data in management table 300 ends (determination at step 404 of FIG. 10 is positive), blank rows in management table 300 are deleted at step 414, management table 300 is formed anew, and the print data deleting process ends.

As described above, according to the present embodiment, when electronic data is stored in a storage medium and thereafter the user requests server 108 to generate print data corresponding to the electronic data using client 100, the print data corresponding to the electronic data is formed by server 108. ID information uniquely identifying the print data is formed simultaneously by server 108 and transmitted to client 100. Client 100 records the ID information on the storage medium that stores the original electronic data. When the user connects the storage medium to media reader/writer 162 of image forming apparatus 102, the ID information in the storage medium is read and transmitted to server 108. Server 108 transmits the print data corresponding to the ID information to image forming apparatus 102, and image forming apparatus 102 prints the print data using printing unit 168. It is unnecessary for the user to remember or record each piece of ID information of print data, and the user can easily have the desired electronic data printed by the network print system.

Server 108 manages validity term (expiration date) of the print data, and expired print data is automatically deleted. Unnecessary print data is not left indefinitely and, the storage area of server 108 can efficiently be used. Further, every time the storage medium is connected to media reader/writer 140 in client 100, whether or not print data corresponding to the pieces of ID information stored in the storage medium exist is checked, and if such print data does not exist, the corresponding ID information is automatically deleted from the storage medium. Unlimited consumption of storage area of the storage medium by the pieces of ID information can be avoided, and manual deletion of ID information by the user is unnecessary. Thus, the storage area of the storage medium can efficiently be utilized.

In the embodiment above, related programs in client 100 and image forming apparatus 102 are assumed to be activated by the user using a menu. The present embodiment, however, is not limited to such a method. By way of example, the program such as shown in FIG. 3 may be automatically activated in client 100 when the storage medium is connected to media reader/writer 140. The same applies to image forming apparatus 102.

<Second Embodiment>

In the first embodiment described above, though client 100 and image forming apparatus 102 are communicable to each other, the process is not conducted through direct cooperation with each other. The present invention, however, is not limited to such an embodiment. If client 100 and image forming apparatus 102 are at the same site, for example, installed in the same convenience store, it is possible to identify the apparatuses and therefore, it is possible to process in cooperated manner and to provide more convenient service for the user.

In the system in accordance with the first embodiment, the user notifies the ID information of electronic data (print data) as the object from client 100 to image forming apparatus 102 by means of the storage medium. If cooperation by client 100 and image forming apparatus 102 is possible, the ID information can be transmitted not through the storage medium but directly from client 100 to image forming apparatus 102. The ID information of the object of printing can be known in image forming apparatus 102 before the user connects the storage medium from client 100 to image forming apparatus 102. Therefore, before the user connects the storage medium to image forming apparatus 102, the print data corresponding to the ID information can be received from server 108, using the ID information transmitted from client 100. Provided that the generation of print data has been completed in server 108 by that time, the print data can be downloaded to image forming apparatus 102 without waiting for the connection of storage medium and, therefore, when the user connects the storage medium to image forming apparatus 102, printing of the print data corresponding to the ID information stored in the storage medium can be started immediately.

In the following, the configuration of network print system in accordance with the second embodiment will be described, mainly focusing on the software. The print network system may have the same hardware configuration as that of the first embodiment shown in FIGS. 1 and 2. Therefore, description thereof will not be repeated here. As is apparent from the description below, it is possible to integrate client 100 and image forming apparatus 102. In that case, the hardware of client 100 and the hardware of image forming apparatus 102 may be provided together in one housing, to enable direct communication between the two. Alternatively, the computer section as the hardware may be shared, software for realizing the function of client 100 and software for realizing the function of image forming apparatus 102 may be provided separately, and the following process may be executed through communication between the separate software on the same hardware.

Figure 11:
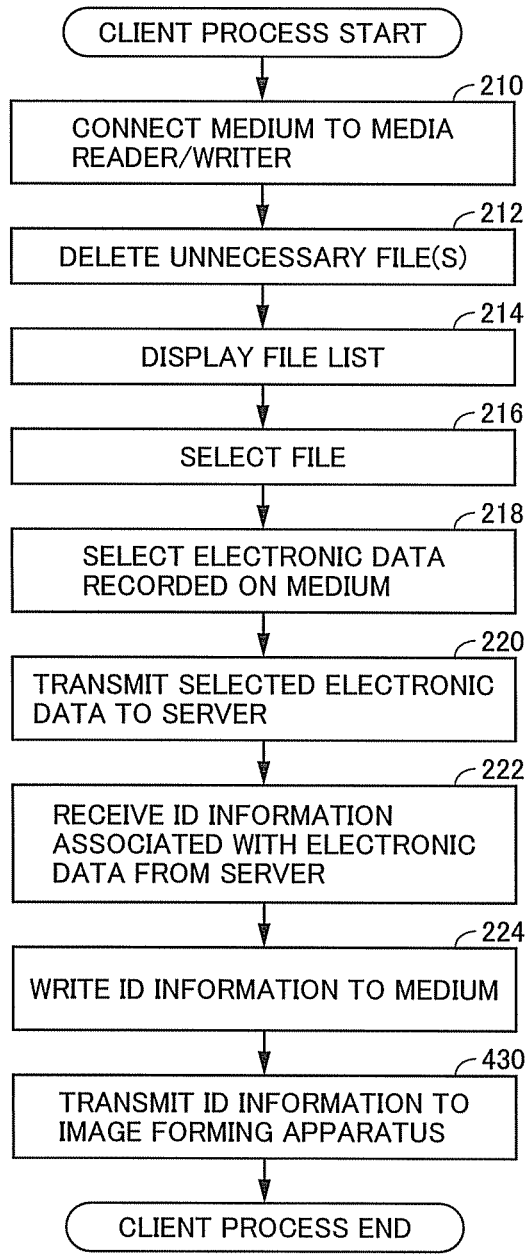
FIG. 11 is a flowchart representing a control structure of a program executed by the client in the system in accordance with a second embodiment of the present invention.

Referring to FIG. 11, in the second embodiment, the program corresponding to the program shown in FIG. 3 of the first embodiment includes, in addition to steps 210 to 224 of FIG. 3, a step 430 following step 224, of transmitting the ID information received at step 222 to image forming apparatus 102 and ending the process. The destination when transmitting ID information from client 100 to image forming apparatus 102 must be set when client 100 is installed in a store. The destination, however, is determined in advance and, therefore, it can be set easily.

Figure 12:
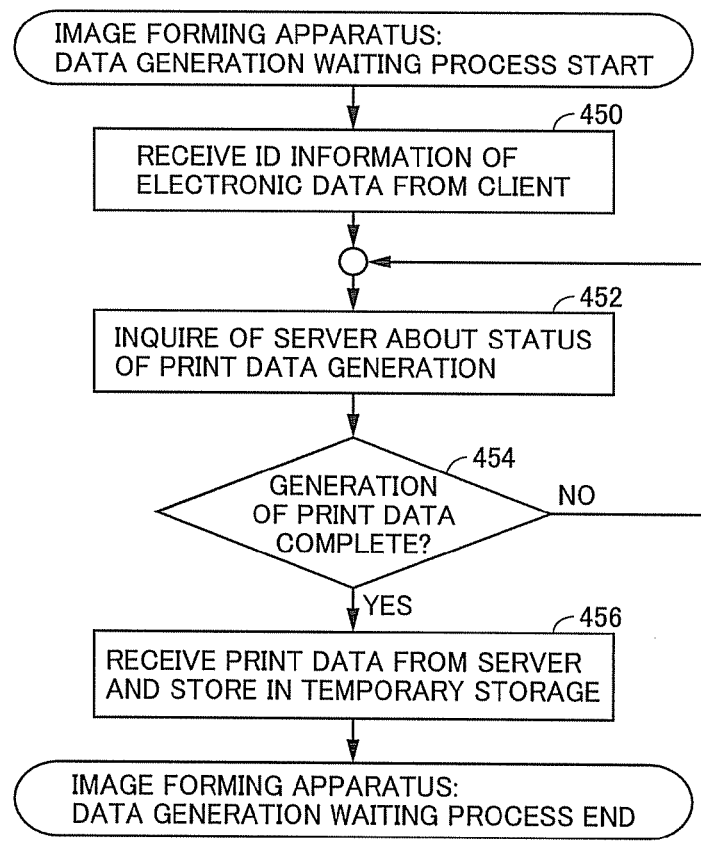
FIG. 12 is a flowchart representing a control structure of a program for receiving print data, executed by the image forming apparatus in the system in accordance with the second embodiment.

In the system in accordance with the second embodiment, image forming apparatus 102 executes the program having the control structure shown in FIG. 12, in addition to the program used in the first embodiment. The program is executed in response to reception of the ID information of the electronic data from client 100 associated in advance with (installed in the same store as) image forming apparatus 102.

Referring to FIG. 12, the program includes: a step 450 of receiving the ID information of electronic data from client 100; a step 452 of inquiring the status of generation of print data corresponding to the ID information to server 108; a step 454 of determining, based on information transmitted from server 108 as a result of inquiry at step 452, whether or not generation of print data corresponding to the ID information has been completed, and returning the control to step 452 if generation is not yet complete; and a step 456, executed if it is determined at step 454 that generation of print data has been complete, of receiving the print data from server 108, temporarily storing the data in a temporary storage device 170 and ending the process.

With such a process activated and executed upon reception of the ID information from client 100, it becomes highly likely that, by the time the user removes the storage medium from media reader/writer 140 of client 100 and connects the medium to media reader/writer 162 of image forming apparatus 102, the print data corresponding to the ID information stored in the storage medium has already been stored in temporary storage device 170 of image forming apparatus 102. Thus, when the request for printing electronic data is issued, the user can immediately remove the storage medium and try printing on image forming apparatus 102, and it is highly likely that actual printing is done without any waste of time.

FIG. 14 is a flowchart of a program activated when the user prints the print data, in image forming apparatus 102 in accordance with the present embodiment. Referring to FIG. 14, the program includes: a step 320 of displaying a message urging connection of the storage medium to media reader/writer 162 and confirming connection of the storage medium; and a step 490 of reading all pieces of ID information stored in the storage medium, and displaying a print object designating screen image 460 shown in FIG. 13 to allow the user to designate a document to be printed.

Figure 13:
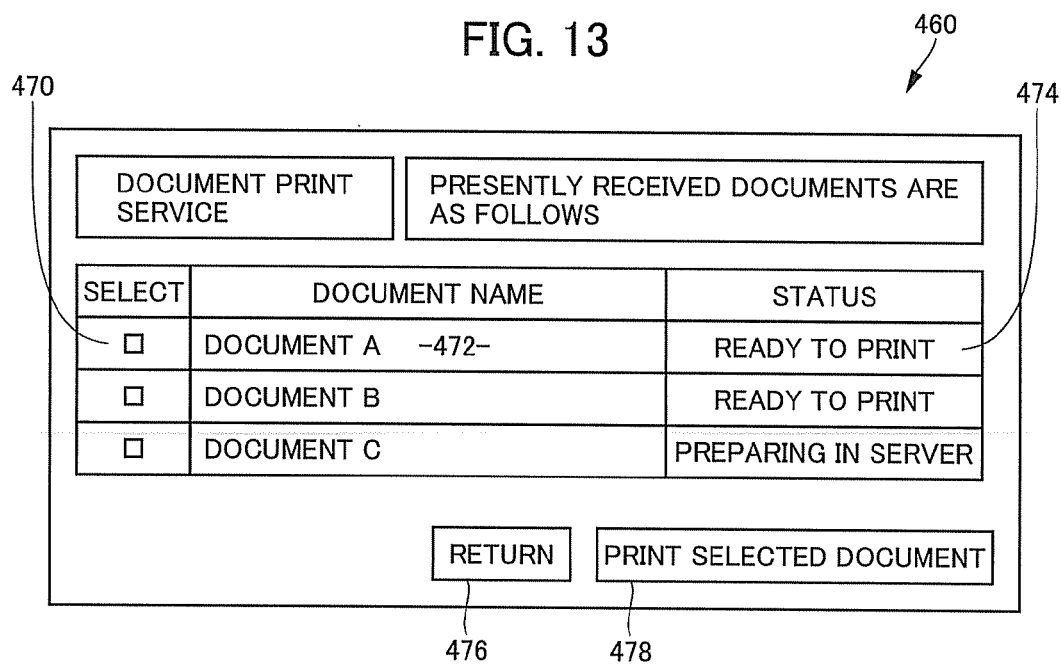
FIG. 13 schematically shows an example of a screen image displayed at the time of selecting print data, on the image forming apparatus.

Referring to FIG. 13, print object designating screen image 460 reflects the contents of management table 300 shown in FIG. 7. At an upper portion of the screen image, a caption "DOCUMENT PRINT SERVICE" and a message "PRESENTLY RECEIVED DOCUMENTS ARE AS FOLLOWS" are displayed.

At the central portion of the screen image, a selection table is displayed, which includes pieces of information corresponding to the ID information stored in the storage medium extracted from the pieces of information stored in management table 300 shown in FIG. 7. Each row of the selection table includes a selection check box 470 for designating whether printing is to be selected or not, a document name 472, and a state display 474 indicating whether or not the print data of the corresponding document is ready. The table only displays the pieces of information that correspond to the pieces of ID information stored in the storage medium. Even if pieces of information related to the print data formed by other user or users should be stored in management table 300, pieces of ID information related to the print data formed by other users are not stored in the storage medium. Therefore, such pieces of information are not displayed on print object designating screen image 460.

In the process in accordance with the present embodiment shown in FIG. 12, if the electronic data corresponding to the ID information most recently received from client 100 has already been ready, the print data can be received. If it is not ready but being prepared, information to that effect is transmitted, and the print data cannot be received until it is ready. Therefore, in the display shown in FIG. 13, documents that can be printed are denoted as "READY TO PRINT" while documents that are being prepared are denoted as "PREPARING IN SERVER" and selection using selection check box 470 is disabled.

At a lower portion of print object designating screen image 460, a cancel button 476 and "PRINT SELECTED DOCUMENT" button 478 are displayed. Though not described with reference to the flowchart shown in FIG. 8 above, the process is stopped if cancel button 476 is pressed. If any of selection check box 470 is checked and "PRINT SELECTED DOCUMENT" button 478 is pressed, printing of the selected document starts.

Again referring to FIG. 14, the program further includes: a step 492, following step 490, of searching whether or not the print data corresponding to the piece of ID information designated at step 490 is stored in temporary storage device 170; a step 494 of determining, based on the result of search at step 492, whether or not the print data exists in temporary storage device 170, and branching the control flow depending on the result of determination; a step 498, executed if the determination at step 494 is negative, of transmitting the ID information designated at step 490 to server 108 and thereby requesting transmission of the corresponding print data; and a step 500 of receiving the print data transmitted from server 108 in response to the transmission request at step 498. The program further includes a step 496 of selectively executing a process for printing the print data found in temporary storage device 170 or a process for printing the print data received at step 500, depending on whether the result of determination at step 494 is positive or negative.

In the second embodiment, when the user using client 100 requests server 108 to print the electronic data, the piece of ID information corresponding to the electronic data is transmitted from the server through client 100 to image forming apparatus 102. In response to the piece of ID information, image forming apparatus 102 can receive the corresponding print, data from server 108, without the necessity of waiting for an instruction from the user. Therefore, by the time the user connects the storage medium to image forming apparatus 102, it is highly likely that printing of the print data can be started immediately.

Further, according to the second embodiment, if the print data of which printing is designated is stored in temporary storage device 170 of image forming apparatus 102, printing based on the print data is executed. If the print data is not stored in temporary storage device 170, the ID information selected by the user is transmitted to server 108, whereby the print data can be received from server 108 and printing is possible. Thus, as compared with the first embodiment, the time from when the user requests printing of electronic data until he/she gets the actual print can be made shorter.

In the foregoing, both in the first and second embodiments, it is assumed that client 100 and image forming apparatus 102 are separate bodies. As already mentioned briefly above, however, these may be provided in the same housing, or alternatively, in an image forming apparatus including a control unit implemented by a single computer, the computer portion may be operated as client 100 in accordance with the first and second embodiments.

In the embodiments above, it is assumed that server 108 used by client 100 and image forming apparatus 102 are determined in advance, because such arrangement ensures easier printing by the user. The present invention, however, is not limited to such an embodiment. By way of example, the user may select any of a plurality of servers 108, a piece of information identifying the server 108 may be transmitted together with the piece of ID information of the print data to image forming apparatus 102, and the user can receive the service of printing electronic data by the desired server. When using server 108, user authentication may be required. In such a case, information necessary for authentication may be stored in the storage medium, so as to simplify the authentication procedure.

As to the storage medium for storing the ID information, a stick type memory, a card type memory, a portable player or the like may be used. Further, in place of a media reader/writer to which the storage medium is physically connected, a storage device of a portable telephone or the like that transmits/receives ID information by the so called near field communication may be used.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A client apparatus used in a network print system including a print server having a function of generating, in response to reception of electronic data, print data for printing from the electronic data, and returning identification information corresponding to the electronic data to the source of transmission of the electronic data, comprising:
    a data input/output device having a function of communicating with a portable data storage medium, configured to input/output data to/from the data storage medium rendered communicable;
    a data communication device realizing data communication to/from said print server through the network;
    an electronic data transmission device configured to read the electronic data stored in said data storage medium through said data input/output device and to transmit the electronic data to said print server through said data communication device;
    an identification information receiving device configured to receive the identification information corresponding to said electronic data transmitted in response to the electronic data transmitted from said electronic data transmitting device to said print server, from said print server through said data communication device and to store in said data storage medium through said data input/output device,
    an identification information transmitting device configured to read the identification information stored in said data storage medium through said data input/output device and to transmit to said print server through said data communication device;
    a print data presence/absence information receiving device configured to receive a piece of information indicating presence/absence of print data corresponding to the identification information returned in response to said identification information transmitted from said identification information transmitting device, from said print server; and
    an identification information deleting device configured to delete, based on the piece of information received by said print data presence/absence information receiving device, the identification information lacking corresponding print data from said data storage medium through said data input/output device.

2. The client apparatus according to claim 1, connectable to a display device; wherein
    said electronic data transmitting device includes
        a list display device configured to read data names of the electronic data stored in said data storage medium through said data input/output device and to display a list of the data names on the display device connected to said client apparatus,
        a data name designating device configured to receive designation of a data name of the electronic data to be transmitted to said print server through an interactive process with the user, from the list of data names displayed by said list display device, and
        a transmitting device configured to read the electronic data corresponding to the data name designated by said electronic data designating device from said data storage medium through said data input/output device and to transmit the electronic data to said print server through said electronic data transmitting device.

3. A print server, comprising:
    a communication device communicable with a client apparatus provided at a distance and with an image forming apparatus;
    an identification information transmitting device configured to generate, in response to reception of electronic data transmitted from any client apparatus through said communication device, identification information corresponding to the electronic data and to return the identification information to the client apparatus that has transmitted the electronic data;

a print data generating device configured to execute, in response to reception of electronic data, a process for generating print data corresponding to the electronic data;

a storage device configured to store the print data generated by said print data generating device in association with the identification information generated for the corresponding electronic data by said identification information transmitting device;

a print data transmitting device configured to search, in response to reception of a request for transmission of print data with designation of the identification information through a communication device, for the print data stored in association with the identification information designated by the request in said storage device and to transmit the print data to the device that transmitted the request, through said communication device;

a generation date and time storage device configured to store date and time of generation of the print data by said print data generating device, in association with the identification information of each electronic data in said storage device; and a deleting device connected to said generation date and time storage device and to said storage device, configured to periodically check elapsed time from generation of the print data stored in said storage device and to delete the print data older than a predetermined time period from said storage device.

4. A print server as recited in claim 3, further comprising:

an identification information extracting unit responsive to reception of a list of identification information print data from a client apparatus, configured to extract identification information lacking corresponding print data in said storage device, and a transmission unit configured to transmit the identification information extracted by the identification information extracting unit to the client that transmitted the list of identification information.

5. An image forming apparatus, comprising:

a communication device communicable with a print server provided at a distance;

a data input/output device having a function of communicating with a portable data storage medium configured to input/output data to/from the data storage medium rendered communicable;

a print data requesting device configured to read identification information, stored in the data storage medium rendered communicable with said data input/output device and identifying print data generated by said print server to transmit the identification information to said print server through said communication device and thereby to request transmission of the print data;

an image forming unit configured to receive the print data transmitted from said print server in response to the request by said print data requesting device, and to form an image of the print data on a storage medium by controlling said image forming apparatus, an identification information transmitting device configured to read the identification information stored in said data storage medium through said data input/output device and to transmit to said print server through said data communication device, a print data presence/absence information receiving device configured to receive a piece of information indicating presence/absence of print data corresponding to the identification information returned in response to said identification information transmitted from said identification server; and an identification information deleting device configured to delete based on the piece of information received by said print data presence/absence information receiving device the identification information lacking corresponding print data from said data storage medium through said data input/output device.

6. The image forming apparatus according to claim 5, further comprising:

a storage device configured to receive, in response to said communication device receiving identification information of the print data from another device, the print data corresponding to the identification information from said print server and to store the print data; wherein said print data requesting device includes a determining device configured to read identification information stored in the data storage medium rendered communicable with said data input/output device and to determine whether or not the print data corresponding to the identification information is stored in said storage medium, and a print data obtaining device configured to selectively execute a process for reading and thereby obtaining the print data corresponding to the identification information stored in the data storage medium rendered communicable with said data input/output device stored in said storage device and applying the print data as an input to said image forming unit, and a process for reading and thereby obtaining the print data corresponding to the identification information stored in the data storage device rendered communicable with said data input/output device from said print server and applying the print data as an input to said image forming unit depending on the determination by said determining device.

7. A print method comprising the steps of:

establishing communications with a client apparatus provided at a distance and with an image forming apparatus;

generating, in response to reception of electronic data transmitted from any client apparatus through said communications, identification information corresponding to the electronic data and returning the identification information to the client apparatus that transmitted the electronic data;

executing, in response to reception of said electronic data, a process for generating print data corresponding to the electronic data;

storing, in a storage device, the print data generated in the step of executing in association with the identification information generated for the corresponding electronic data in the step of generating;

searching, in response to reception of a request for transmission of print data with designation of the identification information through the communications, for the print data stored in association with the identification information designated by the request in said storage device;

transmitting the print data to the device that transmitted the request through said communications;

storing, in a date and time storage, date and time of generation of the print data in the step of generating, in association with the identification information of each electronic data in said storage device;

periodically checking elapsed time from generation of the print data stored in said storage device; and deleting the print data older than a predetermined time period from said storage device.

* * * * *